(12) United States Patent
Li et al.

(10) Patent No.: US 8,884,538 B2
(45) Date of Patent: Nov. 11, 2014

(54) LIGHT-EMITTING DIODE DRIVING CIRCUIT

(71) Applicant: Macroblock, Inc., Hsinchu (TW)

(72) Inventors: Yan-Cun Li, Hsinchu (TW);
Chin-Chung Cheng, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 74 days.

(21) Appl. No.: 13/728,624

(22) Filed: Dec. 27, 2012

(65) Prior Publication Data

US 2013/0320872 A1     Dec. 5, 2013

(30) Foreign Application Priority Data

May 30, 2012   (TW) .............................. 101119391 A (51) Int. Cl.
*H05B 37/00* (2006.01)
*H05B 39/00* (2006.01)
*H05B 41/14* (2006.01)
*H02M 7/5383* (2007.01)
*H05B 37/02* (2006.01)
*H05B 33/08* (2006.01)

(52) U.S. Cl.
CPC ............ *H05B 37/02* (2013.01); *H05B 33/0848* (2013.01); *H05B 33/0815* (2013.01); *Y02B 20/42* (2013.01)
USPC .............. 315/201; 323/227; 323/291; 363/74

(58) Field of Classification Search
USPC ...................... 315/201; 323/227, 291; 363/74
See application file for complete search history.

(56) References Cited

U.S. PATENT DOCUMENTS

| | | | |
|---|---|---|---|
| 2011/0075463 A1* | 3/2011 | Osaka | 363/127 |
| 2012/0033459 A1* | 2/2012 | Chang et al. | 363/21.18 |
| 2012/0056551 A1* | 3/2012 | Zhu et al. | 315/232 |
| 2012/0224397 A1* | 9/2012 | Yeh | 363/21.12 |
| 2012/0286671 A1* | 11/2012 | Shteynberg et al. | 315/151 |

* cited by examiner

*Primary Examiner* — Dylan White
(74) *Attorney, Agent, or Firm* — Maschoff Brennan (57) ABSTRACT

A light-emitting diode (LED) driving circuit includes a power factor correction (PFC) circuit and a driving controller. The PFC circuit controls a power factor of the LED driving circuit. The LED driving circuit includes an inductor, a switch, a current detection circuit, and a time detection circuit. The inductor senses an inductor current and provide energy to at least one LED. The switch connected to the inductor is conducted according to a driving signal. The current detection circuit connected to the switch detects inductor current information. The time detection circuit connected to the switch detects an energy discharging time during which the inductor current decrease from a peak value to zero. The driving controller connected to the switch, the current detection circuit, and the time detection circuit outputs the driving signal to the switch according to the voltage level and the energy discharging time.

18 Claims, 10 Drawing Sheets

LIGHT-EMITTING DIODE DRIVING CIRCUIT

CROSS-REFERENCE TO RELATED APPLICATIONS

This non-provisional application claims priority under 35 U.S.C. §119(a) on Patent Application No(s). 101119391 filed in Taiwan, R.O.C. on May 30, 2012, the entire contents of which are hereby incorporated by reference.

BACKGROUND

1. Technical Field

The disclosure relates to a light-emitting diode (LED) driving circuit, and more particularly to a LED driving circuit which achieves a stabilized current output, over current protection, over voltage protection, and power factor correction.

2. Related Art

Current LED driving circuits can be generally divided into two types of isolated LED driving circuit and non-isolated LED driving circuit. The non-isolated driving circuit has three basic architectures, i.e., buck converter, boost converter, and buck-boost converter. No matter which architecture is used to drive the LED, an appropriate control circuit must be used in order to achieve a high power factor and a stabilized output current.

Figure 1A:
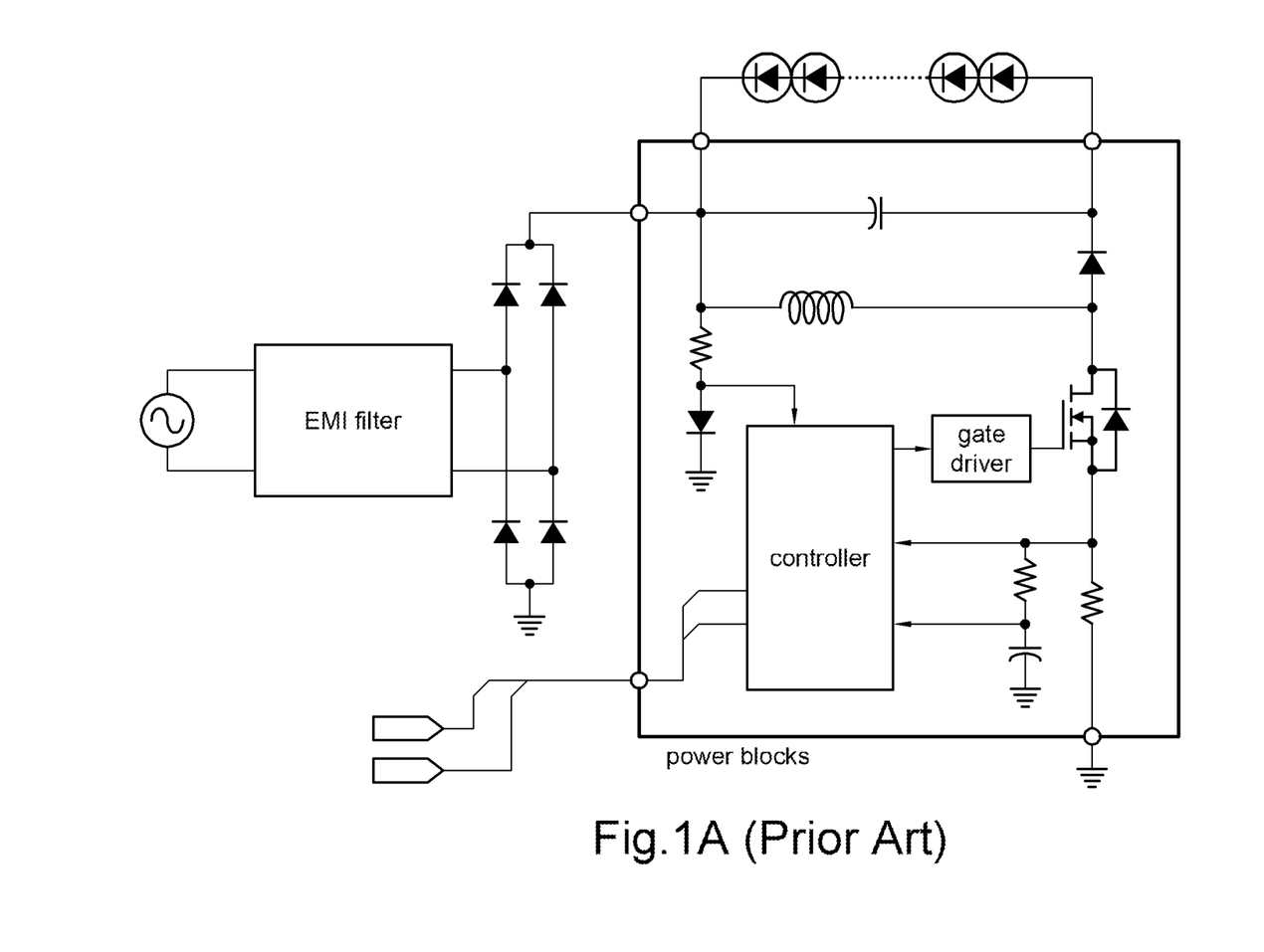
FIG. 1A is a system diagram of a LED driving circuit according to the prior art.
Figure 1B:
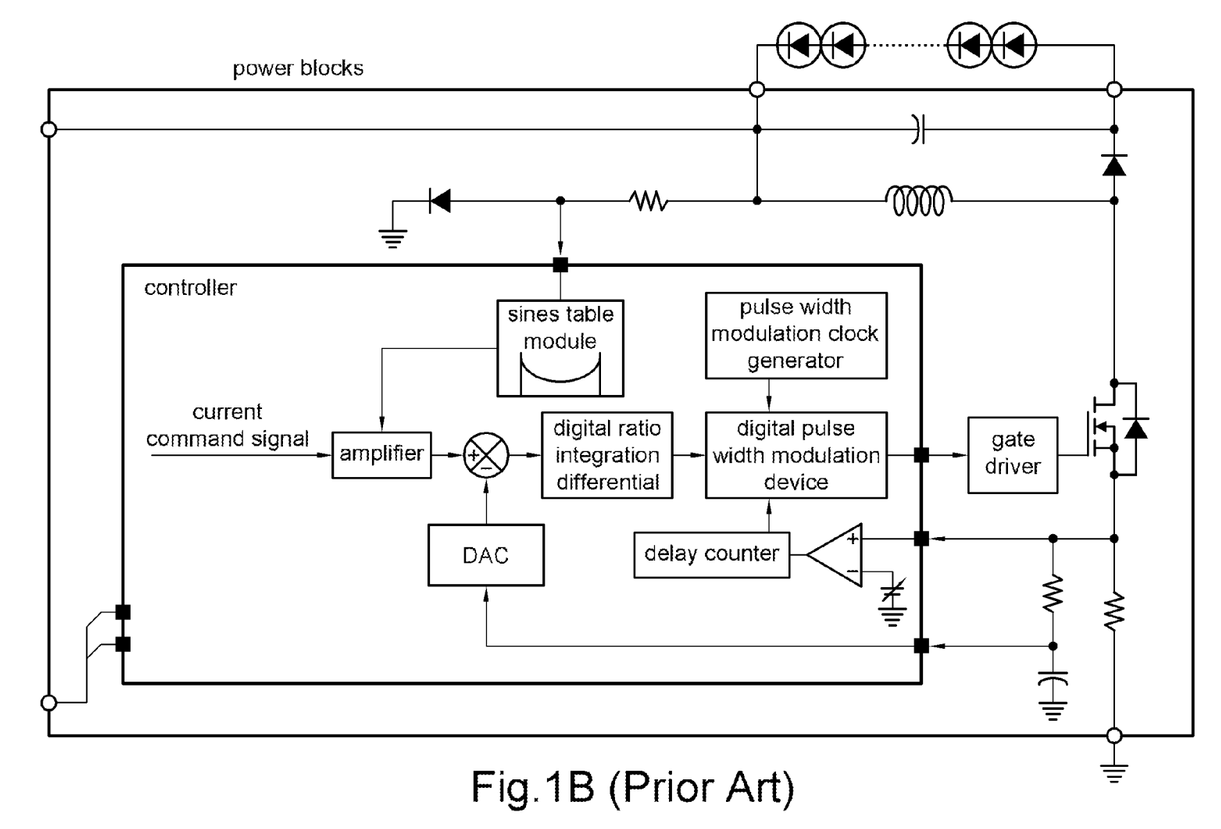
FIG. 1B is a block diagram of a LED driving circuit according to the prior art.

FIG. 1A shows a system diagram for a LED driving circuit according to the prior art. FIG. 1B is a block diagram for LED driving circuit according to the prior art. The architecture shown in FIG. 1A and FIG. 1B is a buck-boost converter. The buck-boost converter senses the phase signal of the input voltage, based on the sines table and digital control, the power factor correction (PFC) can be achieved. The buck-boost converter uses digital calculation to detect and control the current outputted to the LED, and thus the rapid over current protection can be achieved by analog control.

The above mentioned control method has functions of PFC and controlling the output current, but it is limited by the phase of the input voltage, the number of sample points for sines table, the response speed of the digital to analog converter (DAC) and etc. Therefore, the design complexity of the controller is increased.

SUMMARY

In one aspect, a light-emitting diode (LED) driving circuit for driving at least one LED is disclosed. The LED driving circuit comprises a power factor correction (PFC) circuit and a driving controller. The PFC circuit is used to control a power factor of the LED driving circuit. The PFC circuit at least comprises an inductor, a switch, a current detection circuit, and a time detection circuit. The first end of the inductor is connected to a positive end of the power supply source. The inductor is configured to sense an inductor current and provide energy to at least one LED. The switch is connected to a second end of the inductor. The switch is conducted according to a driving signal. The current detection circuit is connected to the switch and is used to detect the inductor current information. The time detection circuit is connected to the switch and is used to detect an energy discharging time during which the inductor current decreases from a peak value to zero. The driving controller is connected to the switch, the current detection circuit, and the time detection circuit. The driving controller is configured to output the driving signal to the switch according to the inductor current information and the energy discharging time.

In another aspect, a light-emitting diode (LED) driving circuit for driving at least one LED. The LED driving circuit comprises a power factor correction (PFC) circuit and a driving controller. The PFC circuit is used to control a power factor of the LED driving circuit. The PFC circuit comprises a transformer, a switch, a current detection circuit, and a time detection circuit. The transformer has a primary coil and a secondary coil. The first end of the primary coil is connected to a positive end of the power supply source. The secondary coil is coupled to energy stored in the primary coil to provide energy to the at least one LED. The switch is connected to a second end of the primary coil. The switch is conducted according to a driving signal. The current detection circuit is connected to the switch and is used to detect the inductor current information of transformer primary coil. The time detection circuit is connected to the switch and the second end of the primary coil. The time detection circuit is configured to detect an energy discharging time during which the inductor current decreases from a peak value to zero. The driving controller is connected to the switch, the current detection circuit, and the time detection circuit. The driving controller is configured to output the driving signal to the switch according to the inductor current information and the energy discharging time.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The detailed characteristics and advantages of the disclosure are described in the following embodiments in details, the techniques of the disclosure can be easily understood and embodied by a person of average skill in the art, and the related objects and advantages of the disclosure can be easily understood by a person of average skill in the art by referring to the contents, the claims and the accompanying drawings disclosed in the specifications.

Figure 2:
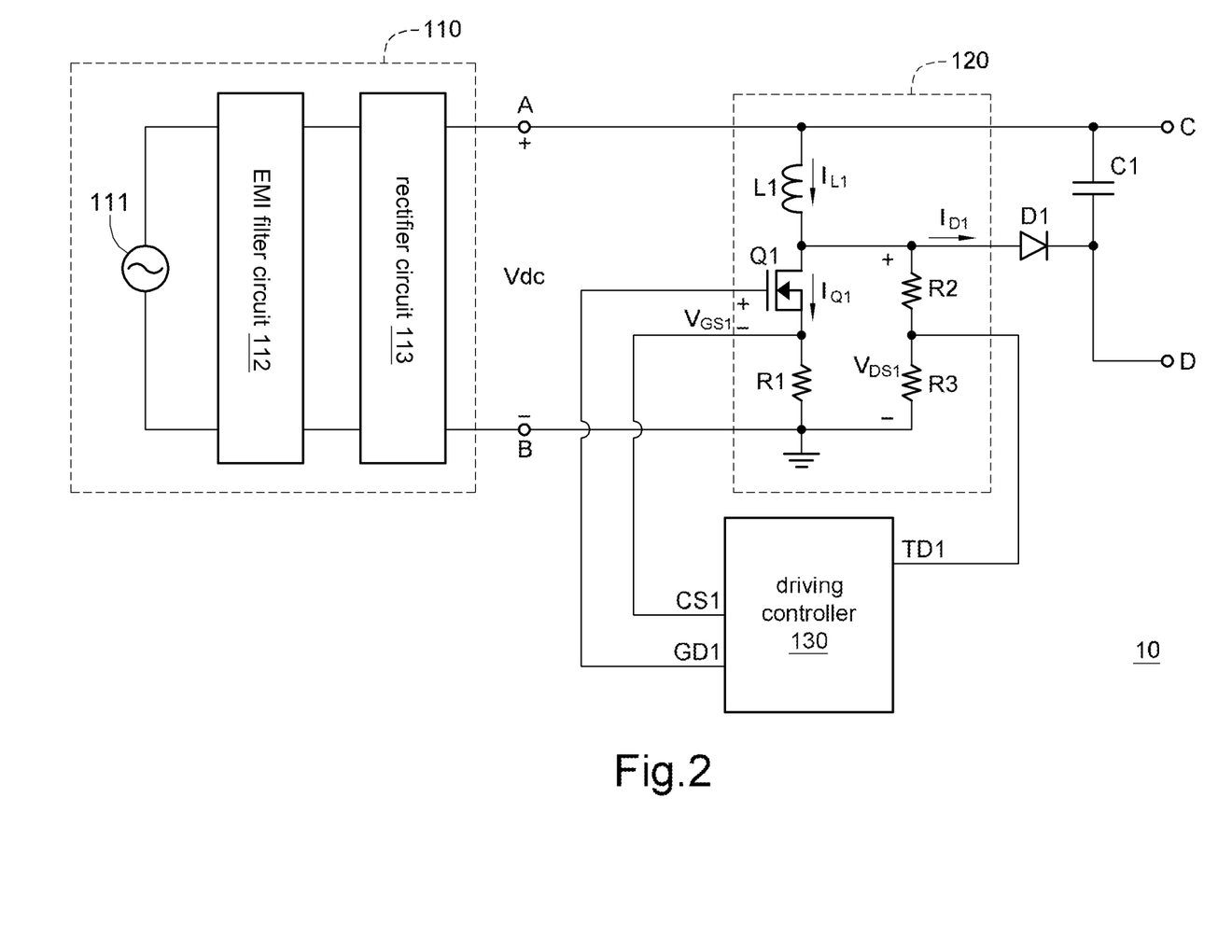
FIG. 2 is an architecture diagram of a LED driving circuit according to an embodiment of the disclosure.

FIG. 2 illustrates a light-emitting diode (LED) driving circuit according to a first embodiment of the disclosure. The LED driving circuit 10 in FIG. 2 comprises a direct current (DC) power supply source circuit 110, a power factor correction (PFC) circuit 120, a driving controller 130, a rectifier D1, and an output capacitor C1. Based on the DC power supply source circuit 110, the LED driving circuit 10 provides a direct current which still has fluctuation to the loaded LED connected to the ends C and D.

In an embodiment, the DC power supply source circuit 110 comprises an alternating current (AC) line source 111, an electromagnetic interference (EMI) filter 112, and a rectified circuit 113. The AC voltage provided by the AC line source 111 is filtered by the EMI filter 112 and the rectified circuit 113 to and thus converted to be the DC input voltage Vdc which still has fluctuation at the ends A and B. In another embodiment, the DC power supply source circuit 110 is implemented by a DC power supply source to provide the DC input voltage Vdc directly.

The PFC circuit 120 is used to control a power factor of the LED driving circuit 10. The PFC circuit 120 comprises an inductor L1, a switch Q1, a current detection circuit, and a time detection circuit. The first end of the inductor L1 is connected to the end A. The first end of the switch Q1 is connected to the second end of the inductor L1. The second end of the switch Q1 is connected to the first end of the current detection circuit and the driving controller 130. The third end of the switch Q1 is connected to the driving controller 130. The second end of the current detection circuit is connected to the end B (i.e., the ground). The first end of the time detection circuit is connected to the second end of the inductor L1 and the first end of the switch Q1. The second end of the time detection circuit is connected to the end B. The third end of the time detection circuit is connected to the driving controller 130.

In an embodiment, the current detection circuit may comprise but not limited to a first resistor R1. The first end of the resistor R1 is connected to the second end of the switch Q1 and the driving controller 130. The second end of the first resistor R1 is connected to the end B. The time detection circuit may comprise but not limited to a second resistor R2 and a third resistor R3. The first end of the second resistor R2 (i.e., the first end of the time detection circuit) is connected to the second end of the inductor L1 and the first end of the switch Q1. The second end of the second resistor R2 is connected to the first end of the third resistor R3 and the driving controller 130. The second end of the third resistor R3 (i.e., the second end of the time detection circuit) is connected to the end B.

Figure 5:
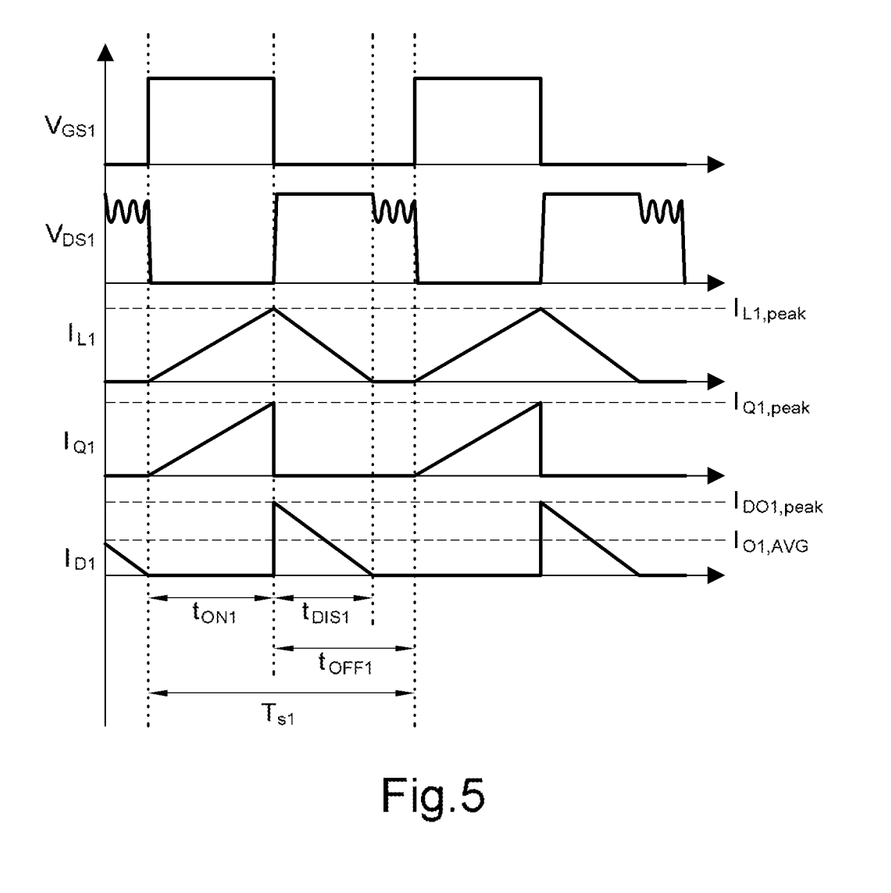
FIG. 5 shows a theoretical waveform of a LED driving circuit according to an embodiment of the disclosure.

When the driving controller 130 provides a control signal GD1 at a high voltage level to the switch Q1, a voltage $V_{GS1}$ is formed between the second end and third end of the switch Q1 and the switch Q1 will be conducted (ON) in a switch conduction time period $t_{ON1}$, as shown in FIG. 5. The input voltage Vdc is applied on the inductor L1. The inductor L1 will be charged, and the inductor current $I_{L1}$ will increase from zero. Furthermore, the output capacitor C1 provides energy to the loaded LED.

The current $I_{Q1}$ through the switch Q1 will increase with the inductor current $I_{L1}$. When the current IQ1 flows through the first resistor R1 as the current detection circuit, a voltage between the first end and the second end of the first resistor R1 (i.e., the current detection signal CS1) is formed. The driving controller 130 can determine the state of the inductor current $I_{L1}$ according to the voltage level of the current detection signal CS1 so as to detect the inductor current and achieve the output current estimation and the over-current protection.

When the driving controller 130 provides a control signal GD1 at a low voltage level to the switch Q1, the driving controller 130 obtains a peak value $I_{L1,peak}$ of the inductor current $I_{L1}$ according to the current detection signal CS1 at the cut-off moment of the switch Q1, as shown in FIG. 5.

After the cut-off of the switch Q1, the energy stored on the inductor L1 is discharged to the output capacitor C1 and the loaded LED through the rectifier D1. Therefore, a voltage $V_{DS1}$ is formed between the first end and the second end of the time detection circuit. The voltage $V_{DS1}$ is parted by the second resistor R2 and the third resistor R3. That is, a partial voltage (i.e., the time detection signal) TD1 is formed. The driving controller 130 can detect the discharging time of the inductor current $I_{L1}$ according to the partial voltage.

When the inductor current $I_{L1}$ decreases from the peak value $I_{L1,peak}$, the current $I_{D1}$ through the rectifier D1 also decreases from the peak value $I_{DO1,peak}$ and the voltage $V_{DS1}$ remains. When the inductor current $I_{L1}$ decreases to zero, the voltage $V_{DS1}$ will oscillate for a certain time period because of the resonance between a parasitic capacitor of the switch Q1 and the inductor L1. When the driving controller 130 uses the time detection signal to detect that the voltage $V_{DS1}$ begins to oscillate, at the oscillation beginning moment, the driving controller 130 determines whether the discharging from the inductor L1 ends according to the maximum slope variation of the oscillation wave. The time period during which the inductor current $I_{L1}$ decreases from the peak value $I_{L1,peak}$ to zero is called the energy discharging time $t_{DIS}$. The current output current $I_{O1,AVG}$ provided to the loaded LED has relations to the inductor current $I_{L1}$ and the energy discharging time $t_{DIS}$. The relations can be represented by the following equation.

$$I_{O1,AVG} = (I_{DO1,peak} \cdot t_{DIS1})/2T_{S1}$$
$$= (I_{L1,peak} \cdot t_{DIS1})/2T_{S1}$$
$$= (I_{Q1,peak} \cdot t_{DIS1})/2T_{S1}$$

wherein, $T_{s1}$ is a preset switching period of the switch Q1.

Figure 3:
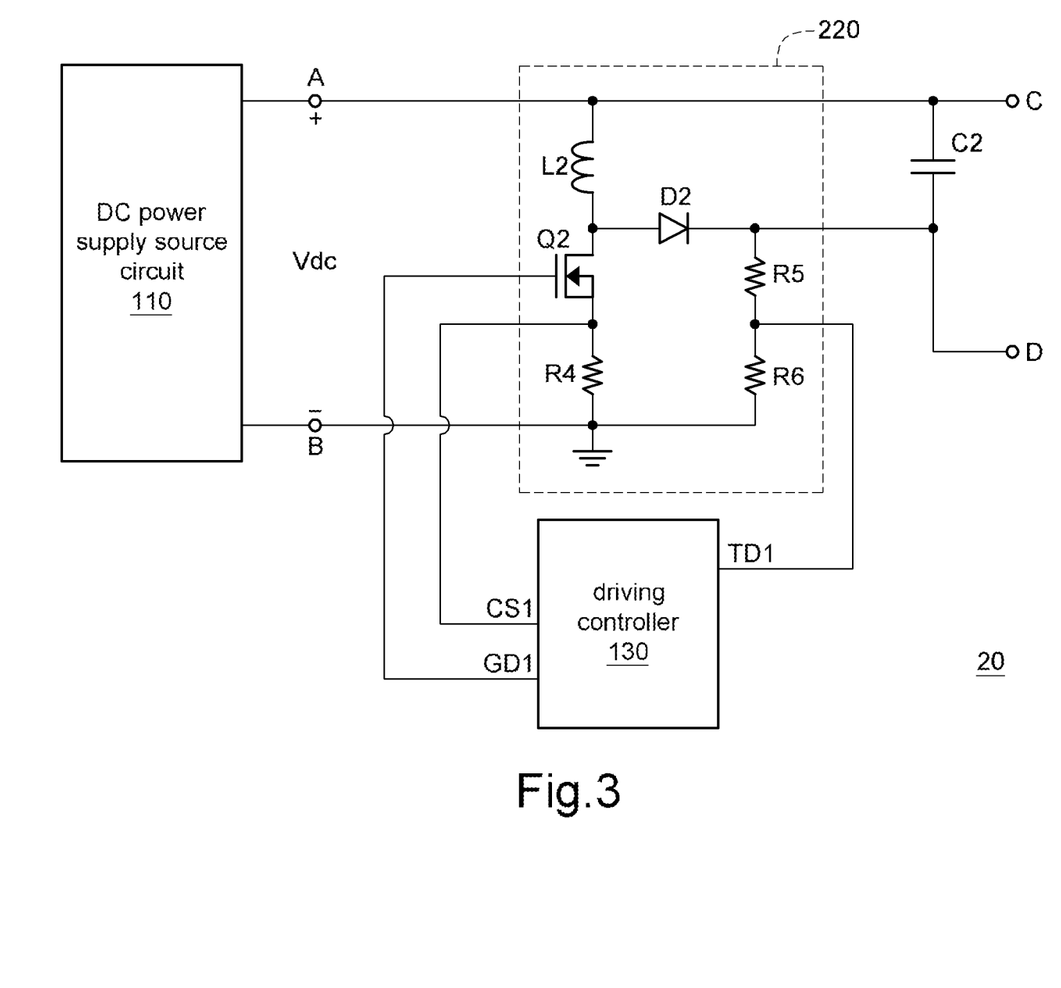
FIG. 3 shows an action diagram of a LED driving circuit according to an embodiment of the disclosure.

FIG. 3 illustrates a light-emitting diode (LED) driving circuit according to a second embodiment of the disclosure. The LED driving circuit 20 in FIG. 3 comprises a direct current (DC) power supply source circuit 110, a power factor correction (PFC) circuit 220, a driving controller 130, a rectifier D2, and an output capacitor C2. The operation for the DC power supply source circuit 110 is the same as that of the FIG. 2, and thus it will not be explained again.

The PFC circuit 220 is used to control a power factor of the LED driving circuit 20. The PFC circuit 220 comprises an inductor L2, a switch Q2, a rectifier D2, a current detection circuit, and a time detection circuit. The first end of the inductor L2 is connected to the end A. The first end of the switch Q2 is connected to the second end of the inductor L2. The second end of the switch Q2 is connected to the first end of the current detection circuit and the driving controller 130. The third end of the switch Q2 is connected the driving controller 130. The second end of the current detection circuit is connected to the end B. The first end of the time detection circuit is connected to the second end of the inductor L2 and the first end of the switch Q2. The second end of the time detection circuit is connected to the end B. The third end of the time detection circuit is connected to the driving controller 130.

In an embodiment, the current detection circuit may comprise but not limited to a first resistor R4. The first end of the resistor R4 is connected to the second end of the switch Q2 and the driving controller 130. The second end of the first resistor R4 is connected to the end B. The first end of the rectifier D2 is connected to the second end of the inductor L2 and the first end of the switch Q2. The time detection circuit may comprise but not limited to a second resistor R5 and a third resistor R6. The first end of the second resistor R5 (i.e., the first end of the time detection circuit) is connected to the second end of the rectifier D2. The second end of the second resistor R5 is connected to the first end of the third resistor R6 and the driving controller 130. The second end of the third resistor R6 is connected to the end B (i.e., the second end of the time detection circuit).

The first end of the output capacitor C2 is connected to the first end of the inductor L2 and the end C. The second end of the output capacitor C2 is connected to the second end of the rectifier D2, the first end of the second resistor R5, and the end D. The operation for the LED driving circuit 20 can be referred to FIG. 5.

Figure 4:
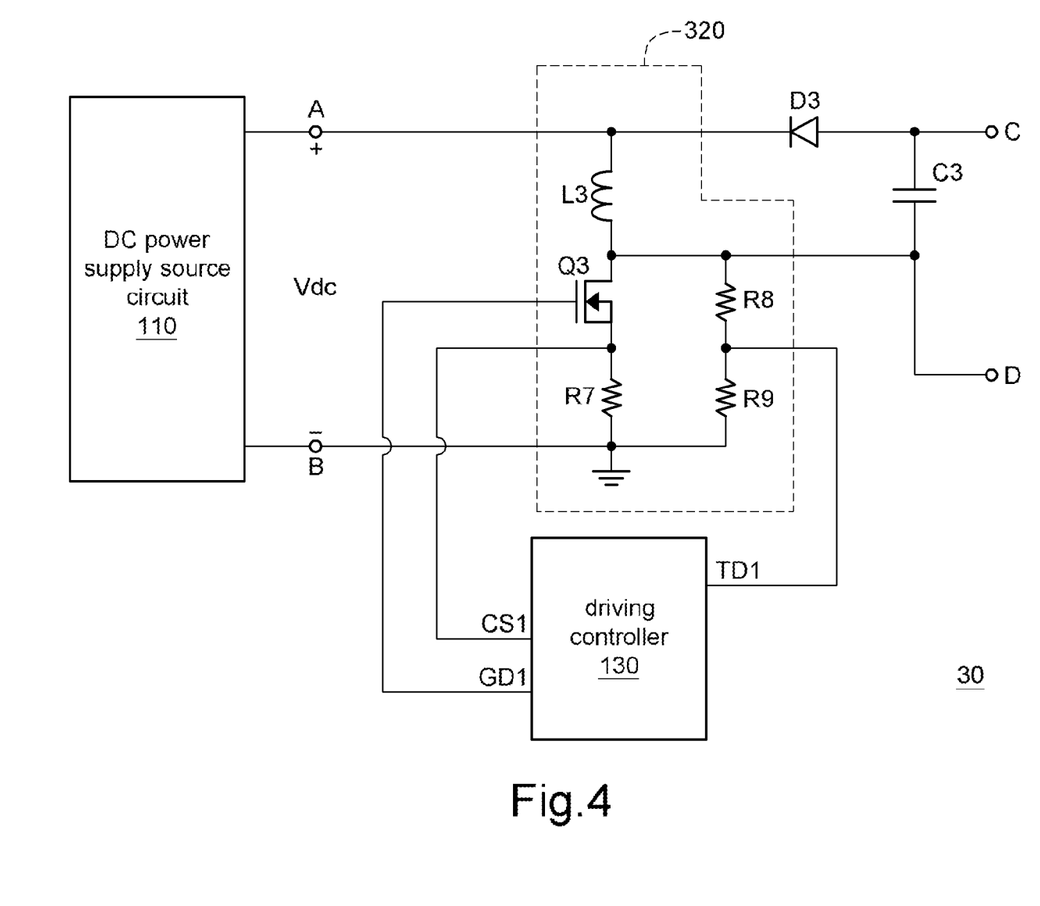
FIG. 4 is an architecture diagram of a LED driving circuit according to an embodiment of the disclosure.

FIG. 4 illustrates a light-emitting diode (LED) driving circuit according to a third embodiment of the disclosure. The LED driving circuit 30 in FIG. 4 comprises a direct current (DC) power supply source circuit 110, a power factor correction (PFC) circuit 320, a driving controller 130, a rectifier D3, and an output capacitor C3. The operation for the DC power supply source circuit 110 is the same as that of the FIG. 2, and thus it will not be explained again.

The PFC circuit 320 is used to control a power factor of the LED driving circuit 30. The PFC circuit 320 comprises an inductor L3, a switch Q3, a current detection circuit, and a time detection circuit. The first end of the inductor L3 is connected to the end A. The first end of the switch Q3 is connected to the second end of the inductor L3. The second end of the switch Q3 is connected to the current detection circuit and the driving controller 130. The third end of the switch Q3 is connected the driving controller 130. The second end of the current detection circuit is connected to the end B. The first end of the time detection circuit is connected to the second end of the inductor L3 and the first end of the switch Q3. The second end of the time detection circuit is connected to the end B. The third end of the time detection circuit is connected to the driving controller 130.

In an embodiment, the current detection circuit may comprise but not limited to a first resistor R7. The first end of the resistor R7 is connected to the second end of the switch Q3 and the driving controller 130. The second end of the first resistor R7 is connected to the end B. The time detection circuit may comprise but not limited to a second resistor R8 and a third resistor R9. The first end of the second resistor R8 (i.e., the first end of the time detection circuit) is connected to the second end of the inductor L3 and the first end of the switch Q3. The second end of the second resistor R8 is connected to the first end of the third resistor R9 and the driving controller 130. The second end of the third resistor R9 (i.e., the second end of the time detection circuit) is connected to the end B.

The first end of the output capacitor C3 is connected to the first end of the rectifier D3 and the end C. The second end of the output capacitor C3 is connected to the second end of the inductor L3, the first end of the switch Q3, the first end of the second resistor R8, and the end D. The second end of the rectifier D3 is connected to the first end of the inductor L3. The operation for the LED driving circuit 30 can be referred to FIG. 5.

Figure 6:
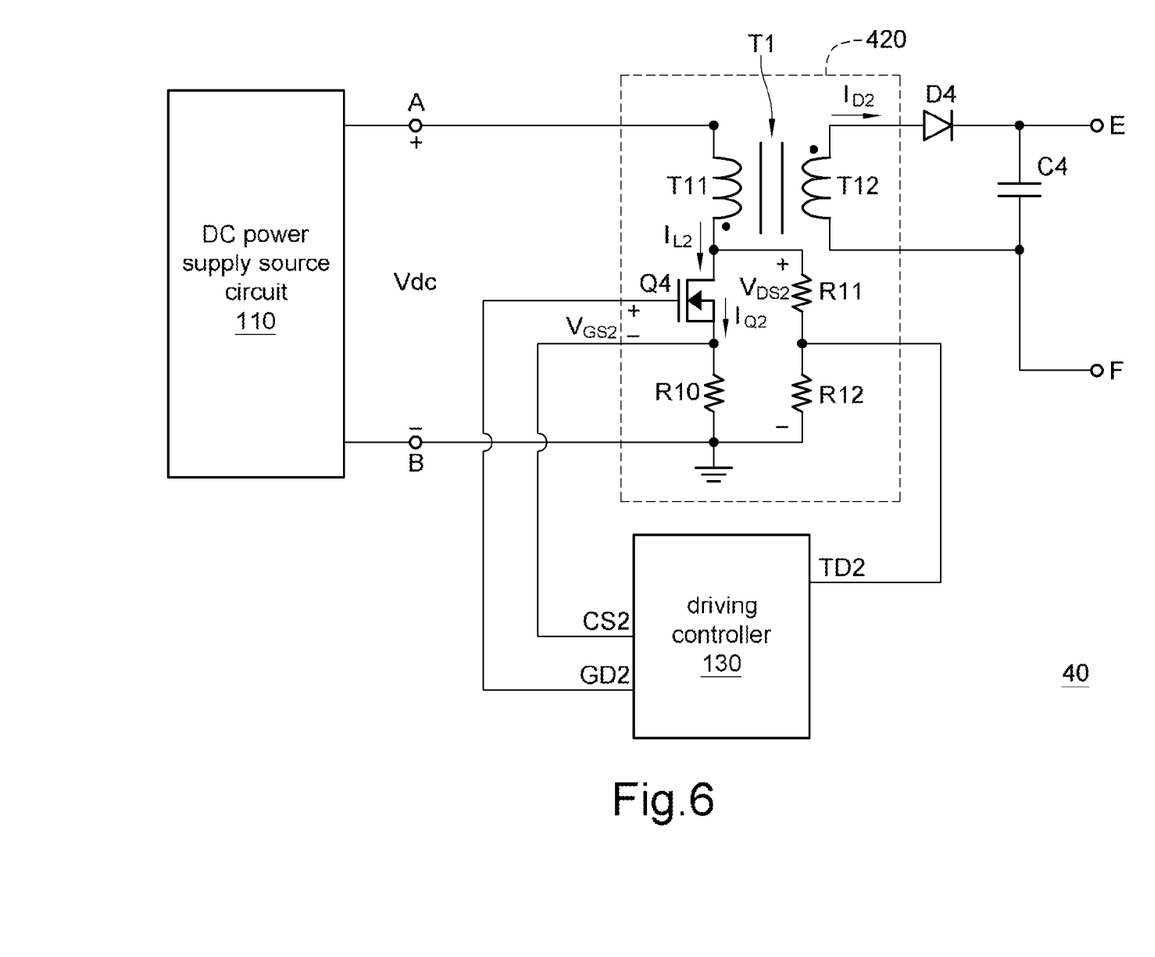
FIG. 6 is a block diagram of a driving controller according to an embodiment of the disclosure.

The above mentioned first to third embodiments are non-isolated LED driving circuits. Therefore, the end C is a negative end, and the end D is a positive end. FIG. 6 illustrates a light-emitting diode (LED) driving circuit according to a fourth embodiment of the disclosure. The LED driving circuit 40 in FIG. 6 comprises a direct current (DC) power supply source circuit 110, a power factor correction (PFC) circuit 420, a driving controller 130, a rectifier D4, and an output capacitor C4. The operation for the DC power supply source circuit 110 is the same as that of the FIG. 2, and thus it will not be explained again.

The PFC circuit 420 is used to control a power factor of the LED driving circuit 40. The PFC circuit 420 comprises a transformer T1, a switch Q4, a current detection circuit, and a time detection circuit. The transformer T1 comprises a primary coil T11 and a secondary coil T12. The first end of the primary coil T11 is connected to the end A. The first end of the switch Q4 is connected to the second end of the primary coil T11. The second end of the switch Q4 is connected to the first end of the current detection circuit and the driving controller 130. The third end of the switch Q4 is connected the driving controller 130. The second end of the current detection circuit is connected to the end B. The first end of the time detection circuit is connected to the second end of the primary coil T11 and the first end of the switch Q4. The second end of the time detection circuit is connected to the end B. The third end of the time detection circuit is connected to the driving controller 130.

In an embodiment, the current detection circuit may comprise but not limited to a first resistor R10. The first end of the resistor R10 is connected to the second end of the switch Q4 and the driving controller 130. The second end of the first resistor R10 is connected to the end B. The time detection circuit may comprise but not limited to a second resistor R11 and a third resistor R12. The first end of the second resistor R11 (i.e., the first end of the time detection circuit) is connected to the second end of the primary coil T11 and the first end of the switch Q4. The second end of the second resistor R11 is connected to the first end of the third resistor R12 and the driving controller 130. The second end of the third resistor R12 (i.e., the second end of the time detection circuit) is connected to the end B.

The first end of the rectifier D4 is connected to the first end of the secondary coil T12. The second end of the rectifier D4 is connected to the first end of the output capacitor C4 and the end E. The second end of the output capacitor C4 is connected to the second end of the secondary coil T12 and the end F. The ends E and F are connected to the load.

Figure 8:
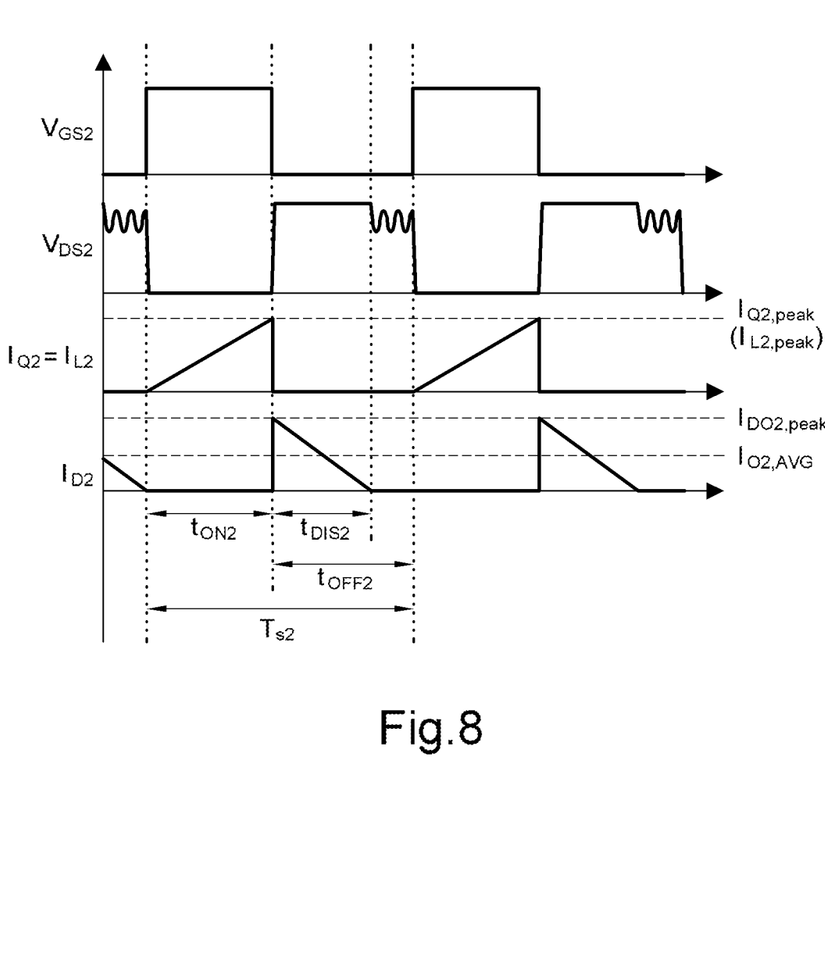
FIG. 8 shows a theoretical waveform of a LED driving circuit according to an embodiment of the disclosure.

When the driving controller 130 provides a control signal at a high voltage level to the switch Q4, a voltage $V_{GS2}$ is formed between the second end and third end of the switch Q4 and the switch Q4 will be conducted (ON) in a switch conduction time period $t_{ON2}$, as shown in FIG. 8. The input voltage Vdc is applied on the primary coil T11. The inductor current $I_{L2}$ through the primary coil T11 will increase from zero. The increase speed of the inductor current $I_{L2}$ is in proportion to the input voltage Vdc. The current $I_{Q2}$ through the switch Q4 is equal to the inductor current $I_{L2}$ through the primary coil T11.

When the current $I_{Q2}$ flows through the first resistor R10 as the current detection circuit, a voltage between the first end and the second end of the first resistor R10 (i.e., the current detection signal CS2) is formed. The driving controller 130 can determine the state of the inductor current $I_{L2}$ at the primary coil side according to the voltage level of the current detection signal CS2 so as to detect the inductor current at the primary coil side and achieve the output current estimation and the over-current protection. When the driving controller 130 provides a control signal at a low voltage level to the switch Q4, the voltage $V_{GS2}$ between the second end and the third end of the switch Q4 changes to zero and the switch Q4 will be cut-off (OFF) during the switch cutting-off time period $t_{OFF2}$. The driving controller 130 obtains a peak value $I_{L2,\,peak}$ of the current $I_{L2}$ according to the current detection signal CS2 at the cut-off moment of the switch Q1, as shown in FIG. 8.

At this time, the energy stored in the magnetizing inductance of the transformer T1 is discharged through the rectifier D4, and thus the current $I_{D2}$ is formed and a voltage $V_{DS2}$ between the first end and the second end of the time detection circuit is formed. The voltage $V_{DS2}$ is parted by the second resistor R11 and the third resistor R12. That is, a partial voltage (i.e., the time detection signal) TD2 is formed. The driving controller 130 can detect the discharging time of the magnetizing inductor current $I_{L1}$ of the transformer T1 according to the partial voltage.

When the discharging from the magnetizing inductance of the transformer T1 ends, a resonance will occur between a parasitic capacitor in the switch Q4 and the magnetizing inductance and a leakage inductance (not shown in FIG. 6) of the transformer T1. As a result, the voltage $V_{DS2}$ will oscillate for a certain time period. When the driving controller 130 uses the time detection signal TD2 to detect that the voltage $V_{DS2}$ begins to oscillate, at the oscillation beginning moment the driving controller 130 determines whether the discharging from the magnetizing inductance of the transformer T1 ends according to the maximum slope variation of the oscillation wave.

The time period during which the current $I_{L2}$ decreases from the peak value $I_{L1,peak}$ to zero is called energy discharging time $t_{DIS2}$ for the magnetizing inductance of the transformer T1. The current output current $I_{O2,AVG}$ provided to the loaded LED has relations to the inductor current $I_{L2}$ and the energy discharging time $t_{DIS2}$. The relations can be represented by the following equation.

$$I_{O2,AVG} = (I_{DO2,peak} \cdot t_{DIS2})/2T_{S2}$$
$$= (I_{L2,peak} \cdot t_{DIS2})/2T_{S2}$$
$$= (I_{Q2,peak} \cdot t_{DIS2})/2T_{S2}$$

wherein, $T_{s2}$ is a preset switching period of the switch Q4, the current $I_{DO2,peak}$ is the peak value of the current $I_{D2}$, and the current $I_{Q2,peak}$ is the peak value of the current $I_{Q2}$.

Figure 7:
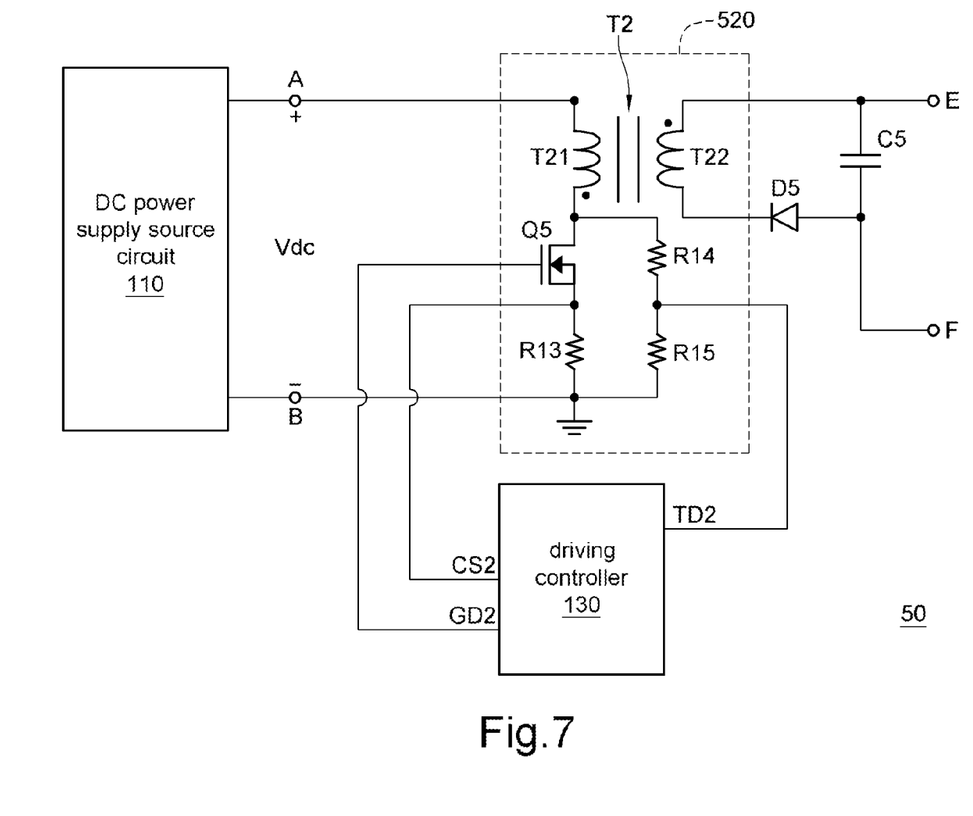
FIG. 7 is a block diagram of a driving controller according to an embodiment of the disclosure.

FIG. 7 illustrates a light-emitting diode (LED) driving circuit according to a fifth embodiment of the disclosure. The LED driving circuit 50 in FIG. 7 comprises a direct current (DC) power supply source circuit 110 (not shown in FIG. 7), a power factor correction (PFC) circuit 520, a driving controller 130, a rectifier D5, and an output capacitor C5. The operation for the DC power supply source circuit is the same as that of the FIG. 2, and thus it will not be explained again.

The PFC circuit 520 is used to control a power factor of the LED driving circuit 50. The PFC circuit 520 comprises a transformer T2, a switch Q5, a current detection circuit, and a time detection circuit. The transformer T2 comprises a primary coil T21 and a secondary coil T22. The first end of the primary coil T21 is connected to the end A. The first end of the switch Q5 is connected to the second end of the primary coil T21. The second end of the switch Q5 is connected to the first end of the current detection circuit and the driving controller 130. The third end of the switch Q5 is connected the driving controller 130. The second end of the current detection circuit is connected to the end B. The first end of the time detection circuit is connected to the second end of the primary coil T21 and the first end of the switch Q5. The second end of the time detection circuit is connected to the end B. The third end of the time detection circuit is connected to the driving controller 130.

In an embodiment, the current detection circuit may comprise but not limited to a first resistor R13. The first end of the resistor R13 is connected to the second end of the switch Q5 and the driving controller 130. The second end of the first resistor R13 is connected to the end B. The time detection circuit may comprise but not limited to a second resistor R14 and a third resistor R15. The first end of the second resistor R14 (i.e., the first end of the time detection circuit) is connected to the second end of the primary coil T21 and the first end of the switch Q5. The second end of the second resistor R14 is connected to the first end of the third resistor R15 and the driving controller 130. The second end of the third resistor R15 (i.e., the second end of the time detection circuit) is connected to the end B.

The second end of the rectifier D5 is connected to the second end of the secondary coil T22. The first end of the rectifier D5 is connected to the end F and the second end of the output capacitor C5. The first end of the output capacitor C5 is connected to the first end of the secondary coil T22 and the end E. The second end of the output capacitor C5 is connected to the first end of the rectifier D5 and the end F. The ends E and F are connected to the load. The operation for the LED driving circuit 50 can be referred to FIG. 8.

The above mentioned fourth and fifth embodiments are isolated LED driving circuit. The polarity of the ends E and F is opposite to that of the ends D and C. In addition, the transformers T1 and T2 may be but not limited to be reverse polarity.

Figure 9:
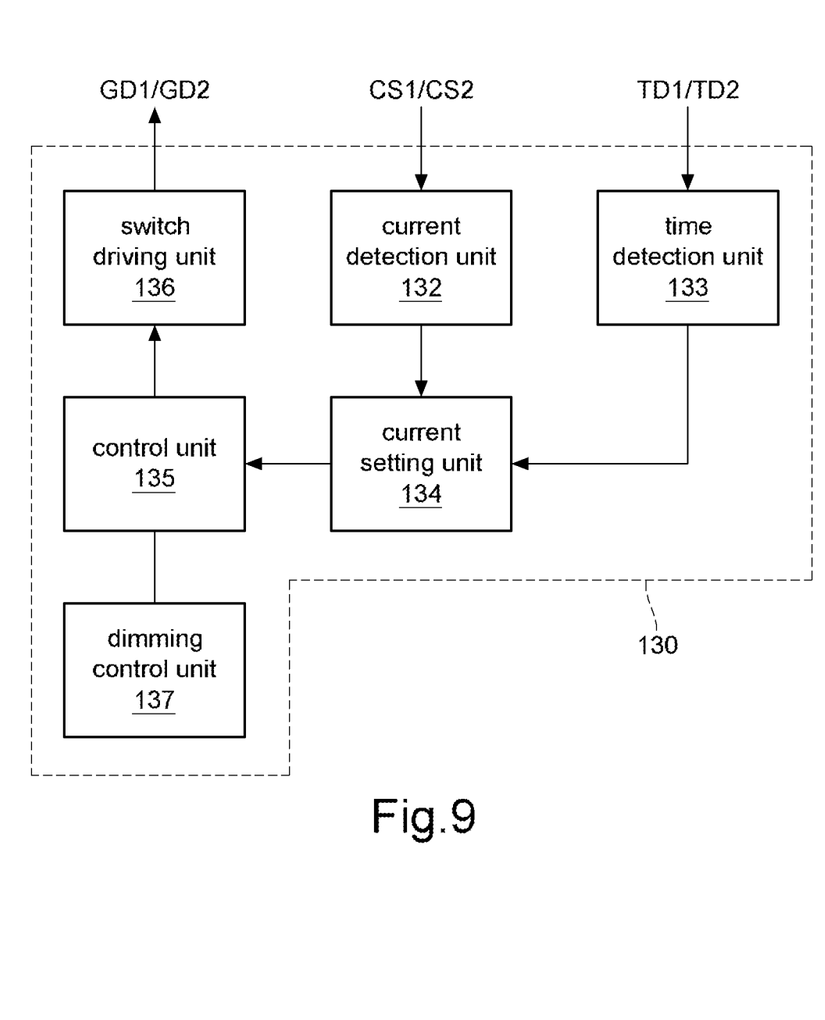
FIG. 9 is a block diagram of a driving controller according to an embodiment of the disclosure.

FIG. 9 is a block diagram of a driving controller according to an embodiment of the disclosure. The driving controller 130 in FIG. 9 comprises an electric power supply unit 821, a current detection unit 132, a time detection unit 133, a current setting unit 134, a control unit 135, a switch driving unit 136, and a dimming control unit 137. The electric power supply unit 821 can be connected to the end A of FIGS. 2, 4, 5, and 6 by a electric power supply circuit (for example, an external circuit or an internal circuit of the driving controller) to provide the operation of the driving controller 130.

The current detection unit 132 can be connected to the current detection circuit in the above mentioned embodiments. That is, the circuit detection unit 132 can be connected to the first end of the resistor R1 of FIG. 2, or the first end of the resistor R4 of FIG. 3, or the first end of the resistor R7 of FIG. 4, or the first end of the resistor R10 of FIG. 6, or the first end of the resistor R13 of FIG. 7. The current detection unit 132 is used to receive the current detection signal CS1 or CS2 and then send the signals to the current setting unit 134.

The time detection unit 133 can be connected to the time detection circuit in the above mentioned embodiments. That is, the time detection unit 133 can be connected to the jointing point of the resistors R2 and R3 (i.e., the third end of the time detection circuit) in FIG. 3, or the jointing point of the resistors R8 and R9 (i.e., the third end of the time detection circuit) in FIG. 4, or the jointing point of the resistors R11 and R12 (i.e., the third end of the time detection circuit) in FIG. 6, or the jointing point of the resistors R14 and R15 (i.e., the third end of the time detection circuit) in FIG. 7. The time detection unit 133 is used to receive the time detection signal TD1 or TD2 and then send the signals to the current setting unit 134.

The current setting unit 134 is connected to the current detection unit 132, the time detection unit 133, and the control unit 135 and is used to receive the current detection signal CS1 and the time detection signal TD1 or the current detection signal CS2 and the time detection signal TD2 so as to generate the current setting signal to the control unit 135. The control unit 135 is connected to the switch driving unit 136 and is used to output a control signal to the switch driving unit 136 according to the current setting signal and the dimming control unit 137.

The switch driving unit 136 is connected to the third end of the switch Q1 of FIG. 2, or the third end of the switch Q2 of FIG. 3, or the third end of the switch Q3 of FIG. 4, or the third end of the switch Q4 of FIG. 6, or the third end of the switch Q5 of FIG. 7. The switch driving unit 136 outputs a driving signal to the switches Q1, Q2, Q3, Q4, and Q5 according to the control signal. As a result, the conduction and cut-off of the switches Q1, Q2, Q3, Q4, and Q5 can be controlled. The driving signal is a pulse width modulation signal.

The dimming control unit 137 is connected to the control unit 135 and is used to provide a dimming control signal to the control unit 135 according to users' requirement. Therefore, based on the dimming control signal, the current for to the loaded LED can be further controlled by the control unit 135.

In the above embodiments, the switch may be Metal-Oxide-Semiconductor Field-Effect Transistor (MOSFET), Bipolar Junction Transistor (BJT), or Isolated Gate bipolar Transistor (IGBT). However, the disclosure is not limited by the embodiments.

The control unit in the above mentioned driving controllers can be implemented by an error-amplifier, a comparator, and a flip-flop. The control unit is used to provide a control signal having frequency characteristics to the switch to control the duty ratio of the switch. However, the disclosure is not limited by the embodiments.

The LED driving circuit in the above embodiments is an AC to DC driving circuit for LED which can be a non-isolated driving circuit or an isolated driving circuit for driving a LED luminance device. However, the disclosure is not limited by the embodiments.

The above embodiments can use the current detection circuit to detect the inductor current to achieve the output current estimation and the over-current protection. In particular, when the switch is cut-off, the time detection unit is used to obtain the node voltage signal for the switch, inductor, or rectifier. Based on the node voltage signal, the over-voltage protection can be achieved. In addition, the detected inductor current peak value and the ending time for the discharging from the inductor can be used to estimate the outputted average current. The duty ratio of switch can be determined by the error amplifier, the comparator, and the flip-flop. In this case, the outputted current can be feed-back controlled and stabilized.

The above mentioned embodiments operate at the Discontinuous Current Mode (DCM) or the Boundary Current Mode (BCM). Furthermore, without line voltage sample, multiplier and sines table, the input current and voltage can be in proportion with each other and at the same phase. In addition, the better line regulation can be also achieved.

Note that the specifications relating to the above embodiments should be construed as exemplary rather than as limitative of the present invention, with many variations and modifications being readily attainable by a person skilled in the art without departing from the spirit or scope thereof as defined by the appended claims and their legal equivalents.

What is claimed is:

1. A light-emitting diode (LED) driving circuit for driving at least one LED, the LED driving circuit comprising:
   a power factor correction (PFC) circuit for controlling a power factor of the LED driving circuit, the PFC circuit at least comprising:
   an inductor, a first end of the inductor being connected to a positive end of a power supply source, the inductor being configured to extract an inductor current and providing energy to at least one LED;
   a switch connected to a second end of the inductor, the switch being conducted according to a driving signal;
   a current detection circuit connected to the switch for detecting a inductor current information; and
   a time detection circuit connected to the switch for detecting an energy discharging time during which the inductor current decreases to zero from the peak value; and
   a driving controller connected to the switch, the current detection circuit, and the time detection circuit, the driving controller being configured to output the driving signal to the switch according to the inductor current information and the energy discharging time.

2. The LED driving circuit according to claim 1, wherein a first end of the time detection circuit being connected to a first end of the switch and the second end of the inductor, a second end of the time detection circuit being connected to a ground, a third end of the time detection circuit being connected to the driving controller, a first end of the current detection circuit being connected to a second end of the switch and the driving controller, a second end of the current detection circuit being connected to the ground, and a third end of the switch being connected to the driving controller.

3. The LED driving circuit according to claim 2, wherein the current detection circuit comprising a first resistor, a first end of the first resistor being connected to the second end of the switch and the driving controller, and a second end of the first resistor being connected to the ground.

4. The LED driving circuit according to claim 2, wherein the time detection circuit comprising a second resistor and a third resistor, a first end of the second resistor being connected to the second end of the inductor and the first end of the switch, a second end of the second resistor being connected to a first end of the third resistor, a second end of the third resistor being connected to the ground, and the second end of the second resistor and the first end of the third resistor being connected to the driving controller.

5. The LED driving circuit according to claim 2, further comprising:
   an output capacitor, a first end of the output capacitor being connected to the first end of the inductor; and
   a rectifier, a first end of the rectifier being connected to the second end of the inductor, the first end of the time detection circuit, and the first end of the switch, a second end of the rectifier being connected to a second end of the output capacitor.

6. The LED driving circuit according to claim 2, further comprising:
   a rectifier, a second end of the rectifier being connected to the first end of the inductor; and
   an output capacitor, a first end of the output capacitor being connected to a first end of the rectifier, a second end of the output capacitor being connected to the second end of the inductor, the first end of the time detection circuit, and the first end of the switch.

7. The LED driving circuit according to claim 1, wherein the PFC circuit further comprising:

a rectifier, a first end of the rectifier being connected to the first end of the switch and the second end of the inductor, and a second end of the rectifier being connected to the time detection circuit.

8. The LED driving circuit according to claim 7, wherein the first end of the rectifier being connected to a first end of the switch and the second end of the inductor, a first end of the current detection circuit being connected to a second end of the switch, a second end of the current detection circuit being connected to a ground, a first end of the time detection circuit being connected to the second end of the rectifier, a second end of the time detection circuit being connected to a ground, a third end of the time detection circuit being connected to the driving controller, and a third end of the switch being connected to the driving controller.

9. The LED driving circuit according to claim 7, wherein the current detection circuit comprising a first resistor, a first end of the first resistor being connected to the second end of the switch and the driving controller, and a second end of the first resistor being connected to the ground.

10. The LED driving circuit according to claim 7, wherein the time detection circuit comprising a second resistor and a third resistor, a first end of the second resistor being connected to the second end of the rectifier, a second end of the second resistor being connected to a first end of the third resistor, a second end of the third resistor being connected to the ground, and the second end of the second resistor and the first end of the third resistor being connected to the driving controller.

11. The LED driving circuit according to claim 7, further comprising:
an output capacitor, a first end of the capacitor being connected to the first end of the inductor, and a second end of the capacitor being connected to the second end of the rectifier and the first end of time detection circuit.

12. A light-emitting diode (LED) driving circuit for driving at least one LED, the LED driving circuit comprising:
a power factor correction (PFC) circuit for controlling a power factor of the LED driving circuit, the PFC circuit comprising:
a transformer having a primary coil and a secondary coil, a first end of the primary coil being connected to a positive end of a power supply source, the transformer being configured to extract an inductor current, the secondary coil being coupled to energy stored in the primary coil to provide energy to the at least one LED;
a switch connected to a second end of the primary coil, the switch being conducted according to a driving signal;
a current detection circuit connected to the switch, the current detection circuit being used to detect an inductor current information; and
a time detection circuit connected to the switch and the second end of the primary coil, the time detection circuit being configured to detect an energy discharging time during which the inductor current decreases from a peak value to zero; and
a driving controller connected to the switch, the current detection circuit, and the time detection circuit, the driving controller being configured to output the driving signal to the switch according to the inductor current information and the energy discharging time.

13. The LED driving circuit according to claim 12, wherein a first end of the time detection circuit being connected to a first end of the switch and the second end of the primary coil, a second end of the time detection circuit being connected to a ground, a third end of the time detection circuit being connected to the driving controller, a first end of the current detection circuit being connected to a second end of the switch, a second end of the current detection circuit being connected to the ground, and a third end of the switch being connected to the driving controller.

14. The LED driving circuit according to claim 13, wherein the current detection circuit comprising a first resistor, a first end of the first resistor being connected to the second end of the switch, a second end of the first resistor being connected to the ground, and the first end of the first resistor and the second end of the switch being connected to the driving controller.

15. The LED driving circuit according to claim 13, wherein the time detection circuit comprising a second resistor and a third resistor, a first end of the second resistor being connected to the second end of the primary coil and the first end of the switch, a second end of the second resistor being connected to a first end of the third resistor and the driving controller, and a second end of the third resistor being connected to the ground.

16. The LED driving circuit according to claim 12, further comprising:
a rectifier, a first end of the rectifier being connected to a first end of the secondary coil; and
an output capacitor, a first end of the output capacitor being connected to a second end of the rectifier, and a second end of the output capacitor being connected to a second end of the secondary coil.

17. The LED driving circuit according to claim 12, further comprising:
an output capacitor, a first end of the output capacitor being connected to a first end of the secondary coil; and
a rectifier, a second end of the rectifier being connected to a second end of the secondary coil, and a first end of the rectifier being connected to a second end of the output capacitor.

18. The LED driving circuit according to claim 12, wherein the transformer is reverse polarity.

* * * * *